(12) United States Patent
Garrido-Lopez et al.

(10) Patent No.: US 9,365,287 B2
(45) Date of Patent: Jun. 14, 2016

(54) METHODS AND SYSTEMS FOR AIRCRAFT GUIDANCE

(71) Applicant: The Boeing Company, Chicago (IL)

(72) Inventors: David Garrido-Lopez, Tres Cantos (ES); Johan L. De Prins, Heverlee (BE)

(73) Assignee: THE BOEING COMPANY, Chicago, IL (US)

( * ) Notice: Subject to any disclaimer, the term of this patent is extended or adjusted under 35 U.S.C. 154(b) by 17 days.

(21) Appl. No.: 14/280,079

(22) Filed: May 16, 2014

(65) Prior Publication Data

US 2014/0343759 A1    Nov. 20, 2014

(30) Foreign Application Priority Data

May 17, 2013  (EP) .................................... 13382183

(51) Int. Cl.
| | |
|---|---|
| G01C 23/00 | (2006.01) |
| B64C 19/00 | (2006.01) |
| G05D 1/10 | (2006.01) |
| G08G 5/00 | (2006.01) |

(52) U.S. Cl.
CPC ............... *B64C 19/00* (2013.01); *G05D 1/101* (2013.01); *G08G 5/0039* (2013.01); *G08G 5/0052* (2013.01); *G08G 5/003* (2013.01)

(58) Field of Classification Search
CPC .......... G06F 15/50; G06F 7/00; G08G 5/0039
USPC .............................. 701/3, 4, 14, 121; 244/182
See application file for complete search history.

(56) References Cited

U.S. PATENT DOCUMENTS

| | | | |
|---|---|---|---|
| 5,121,325 A | 6/1992 | DeJonge | |
| 6,507,782 B1 | 1/2003 | Rumbo et al. | |
| 8,150,565 B2 | 4/2012 | Wachenheim et al. | |
| 8,788,189 B2 * | 7/2014 | Polansky et al. | ............... 701/121 |
| 2010/0282916 A1 | 11/2010 | Garrido-Lopez et al. | |
| 2012/0053760 A1 * | 3/2012 | Burnside et al. | .................. 701/3 |
| 2014/0088799 A1 | 3/2014 | Tino et al. | |
| 2014/0236397 A1 | 8/2014 | Tino et al. | |
| 2014/0277853 A1 * | 9/2014 | Castillo-Effen et al. | .......... 701/3 |

OTHER PUBLICATIONS

Garrido-Lopez et al., "A novel four-dimensional guidance for continuous descent approaches." Digital Avionics Systems Conference, 2009. DASC'09. IEEE/AIAA 28th. IEEE, 2009 (11 pages).

(Continued)

*Primary Examiner* — Thomas G Black
*Assistant Examiner* — Luke Huynh
(74) *Attorney, Agent, or Firm* — Hanley, Flight & Zimmerman, LLC (57) ABSTRACT

Methods and systems for guiding an aircraft are disclosed herein. An example method includes determining, via a processor, a difference between an estimated time of arrival and a required time of arrival of an aircraft. The example method also includes determining if the difference exceeds a threshold time. The example method further includes determining a deviation between a predicted four-dimensional flight trajectory of the aircraft and a measured four-dimensional flight trajectory of the aircraft during flight if the difference does not exceed the threshold time. The example method also includes generating a speed command to reduce the deviation and updating a flight plan of the aircraft based on the speed command.

20 Claims, 5 Drawing Sheets

(56) References Cited

OTHER PUBLICATIONS

Jackson et al., "Airborne Required Time of Arrival (RTA) Control and Integration with ATM," AIAA Aviation Technology Integration and Operations Conference (ATIO Sep. 2007 (Paper AIAA 2007—7835), 17 pages.

Nextgen, "Concept of Operations for the Next Generation Air Transportation System," Version 2.0, Jun. 13, 2007, Joint Planning and Development Office, 219 pages.

* cited by examiner

METHODS AND SYSTEMS FOR AIRCRAFT GUIDANCE

FIELD

This patent relates to methods and systems for aircraft guidance and, in particular, to an improved Required Time of Arrival (RTA) aircraft guidance strategy.

BACKGROUND

Figure 1:
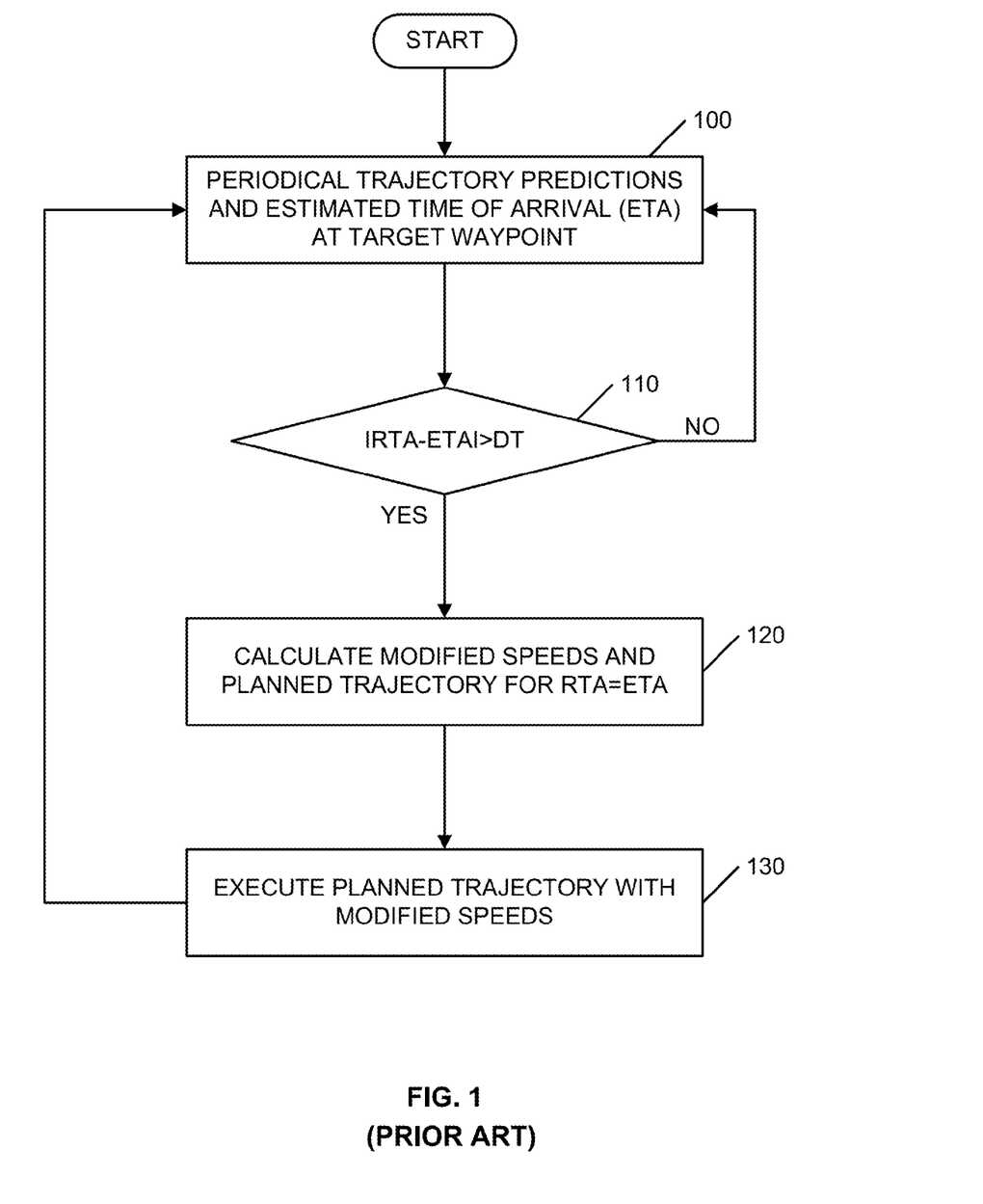
FIG. 1 shows a flowchart representative of a prior art aircraft guidance method.

Required Time of Arrival (RTA) guidance is a widely available technology employed in commercial aircraft. FIG. 1 illustrates a feedback loop that is used to control aircraft speed during cruise and descent.

Guidance of the aircraft involves specification of a Required Time of Arrival at a target waypoint of the flight plan (block 100 of FIG. 1). The aircraft flight management system then periodically predicts an Estimated Time of Arrival (ETA) at the specified target waypoint based upon various measured (e.g., sensed) and predicted variables such as current wind speed/ground speed, weather forecast etc., (also block 100 of FIG. 1).

At block 110 of FIG. 1, a deviation between the RTA and the ETA is determined and, if it is below a chosen threshold DT, then no action is taken. If however the deviation between RTA and ETA exceeds the chosen threshold DT, then at block 120, the aircraft guidance modifies the cruise/descent speeds as part of a new planned trajectory to meet the RTA. At block 130, the planned trajectory (e.g., flight plan) with the modified speeds is executed. Such modifications of planned trajectory speeds take place several times during cruise and descent before arrival at the target waypoint.

The threshold DT is variable in the sense that it is intentionally larger the further away from the waypoint the aircraft is. For example, the threshold time difference between RTA and ETA (below which no adjustments are mandated) may be 1 minute when the aircraft is 200 nautical miles (NM) from the waypoint. This is because the degree of uncertainty in the ETA increases with distance from the waypoint. It is an inefficient use of the engines to continually adjust flight speed to try to narrow the 'dead band' of 1 minute. As the aircraft approaches the target waypoint, it becomes more important to track the RTA more closely, and equally the degree of predictability increases. Thus the value of DT can be reduced. For example, DT may be 5 seconds when the aircraft is 10 NM from the waypoint.

SUMMARY

Methods and systems for aircraft guidance are disclosed herein. An example method disclosed herein includes selecting, via a processor, an initial predicted flight trajectory of an aircraft as a function of time. The initial predicted flight trajectory is based on one or more of an altitude constraint, a speed constraint, or a Required Time of Arrival (RTA) constraint. The example method also includes determining, during flight, a deviation between the initial predicted flight trajectory and a measured current flight trajectory of the aircraft. The example method further includes generating a revised speed command to reduce the deviation and modifying a planned flight speed based upon the revised speed command. The example method further includes executing the revised speed command to reduce time deviations and ground speed deviations with respect to the time and a ground speed, respectively, of the initial predicted flight trajectory.

Another example method includes determining, via a processor, a difference between an estimated time of arrival and a required time of arrival of an aircraft. The example method also includes determining if the difference exceeds a threshold time. The example method further includes determining a deviation between a predicted four-dimensional flight trajectory of the aircraft and a measured four-dimensional flight trajectory of the aircraft during flight if the difference does not exceed the threshold time. The example method also includes generating a speed command to reduce the deviation and updating a flight plan of the aircraft based on the speed command.

Another example method disclosed herein includes determining, via a processor, a deviation between a predicted four-dimensional flight trajectory of an aircraft and a measured four-dimensional flight trajectory of the aircraft during flight. The example method also includes generating a first speed command based on the deviation and adjusting a speed of the aircraft based on the speed command to reduce the deviation. The example method also includes determining a difference between an estimated time of arrival and a required time of arrival of an aircraft at a waypoint, generating a second speed command if the difference exceeds a threshold time, and adjusting the speed of the aircraft based on the second speed command.

DESCRIPTION

Many known guidance techniques are based upon the premise that only the final arrival time or only a discrete set of arrival times at a set of intermediate waypoints is important. The examples disclosed herein, by contrast, employ an initial predicted, or a reference, 4D trajectory. A 4D trajectory is an aircraft trajectory predicted as a function of time. The reference 4D trajectory can be selected based on factors such as altitude, speed, and/or RTA constraints for the aircraft. In other words, in some examples disclosed herein, instead of controlling aircraft speed with the aim of exclusively arriving on time at one, or a discrete number of waypoints, the aircraft speed is also controlled by following the reference 4D trajectory throughout the flight.

Following a reference 4D trajectory rather than simply aiming to arrive at a waypoint at a given time provides several advantages. First, as explained in the background section, large errors between the RTA and the ETA in prior art guidance techniques are both tolerated and indeed inevitable during those parts of the flight distant from the waypoint, not least because of the magnitude of uncertainties there. Following the reference 4D trajectory, by contrast, results in a significant reduction in the difference between the RTA and the actual time of arrival at the waypoint.

By meeting an agreed, or reference, 4D trajectory between ground and air, the aircraft has greater chances of completing the flight without tactical interventions from ground control. Thus, the examples disclosed herein provide fewer chances that the flight will be diverted by ground control from its optional lateral path (vectoring) or put in a holding pattern, and fewer chances that ground control mandates an aircraft speed change. This in turn results in fuel and time savings (fewer delays) with consequential operational and cost benefits.

In some examples, the original RTA speed commands are maintained (based upon control of |RTA−ETA| below DT) but, additionally, control of the speed and flight plan is carried out in complementary fashion to track a reference 4D trajectory with accuracy. Thus some examples disclosed herein allow a trajectory to be shared between the ground and the aircraft, and provide the capability for the aircraft to follow that trajectory with accuracy. Examples disclosed herein can be combined with one or more different and/or alternative RTA based control techniques.

An example method to guide an aircraft may include selecting an initial predicted, or reference, flight trajectory as a function of time; determining during flight, a deviation between the initial predicted flight trajectory and a measured current trajectory; generating a revised speed command in order to minimize the determined deviation; computing modifications to the planned flight speeds, based upon the generated revised speed command; and executing the revised speed command so that the aircraft seeks to reduce time and ground speed deviations with respect to the initial predicted flight trajectory. Some examples may also include identifying an initial Required Time of Arrival (RTA) at a selected waypoint; determining, during flight, an Estimated Time of Arrival (ETA) based upon one or more measured or predicted parameters; calculating a difference between RTA and ETA; determining whether |RTA−ETA| is greater than a threshold time DT; and generating a further revised speed command when it is determined that |RTA−ETA|>DT. The example method may also include repeating certain actions and/or re-executing certain instructions to generate further revised speed commands for causing the aircraft to seek to follow the initial predicted flight trajectory. Determining the deviation may include determining the time difference between a predicted time of arrival at a location within the initial predicted flight trajectory and a measured (e.g., actual) time of arrival at that point, and the speed difference between a predicted speed at that location within the initial predicted flight trajectory and a measured speed at that location within the initial predicted flight trajectory. The speed change defined by the revised speed command may be proportional to the magnitude of the time and/or speed differences.

An example system to guide an aircraft disclosed herein may include means for selecting an initial predicted (e.g., a reference) flight trajectory as a function of time; means for determining during flight, a deviation between the initial predicted flight trajectory and a measured current trajectory; means for generating a revised speed command in order to minimize the determined deviation; means for computing modifications to the planned flight speeds, based upon the generated revised speed command; and means for executing the revised speed command so that the aircraft seeks to follow the initial predicted flight trajectory. Some example systems may also include means for identifying an initial Required Time of Arrival (RTA) at a selected waypoint, means for determining, during flight, an Estimated Time of Arrival (ETA) based upon one or more measured or predicted parameters; means for calculating a difference between RTA and ETA; means for determining whether |RTA−ETA| is greater than a threshold time DT; and means for generating a further revised speed command when it is determined that |RTA−ETA|>DT. The means for determining the deviation may include means for determining the time difference between a predicted time of arrival at a location within the initial predicted flight trajectory, and a measured (e.g., actual) time of arrival at that point, and the speed difference between a predicted speed at that location within the initial predicted flight trajectory, and a measured speed at that location within the initial predicted flight trajectory.

Figure 2:
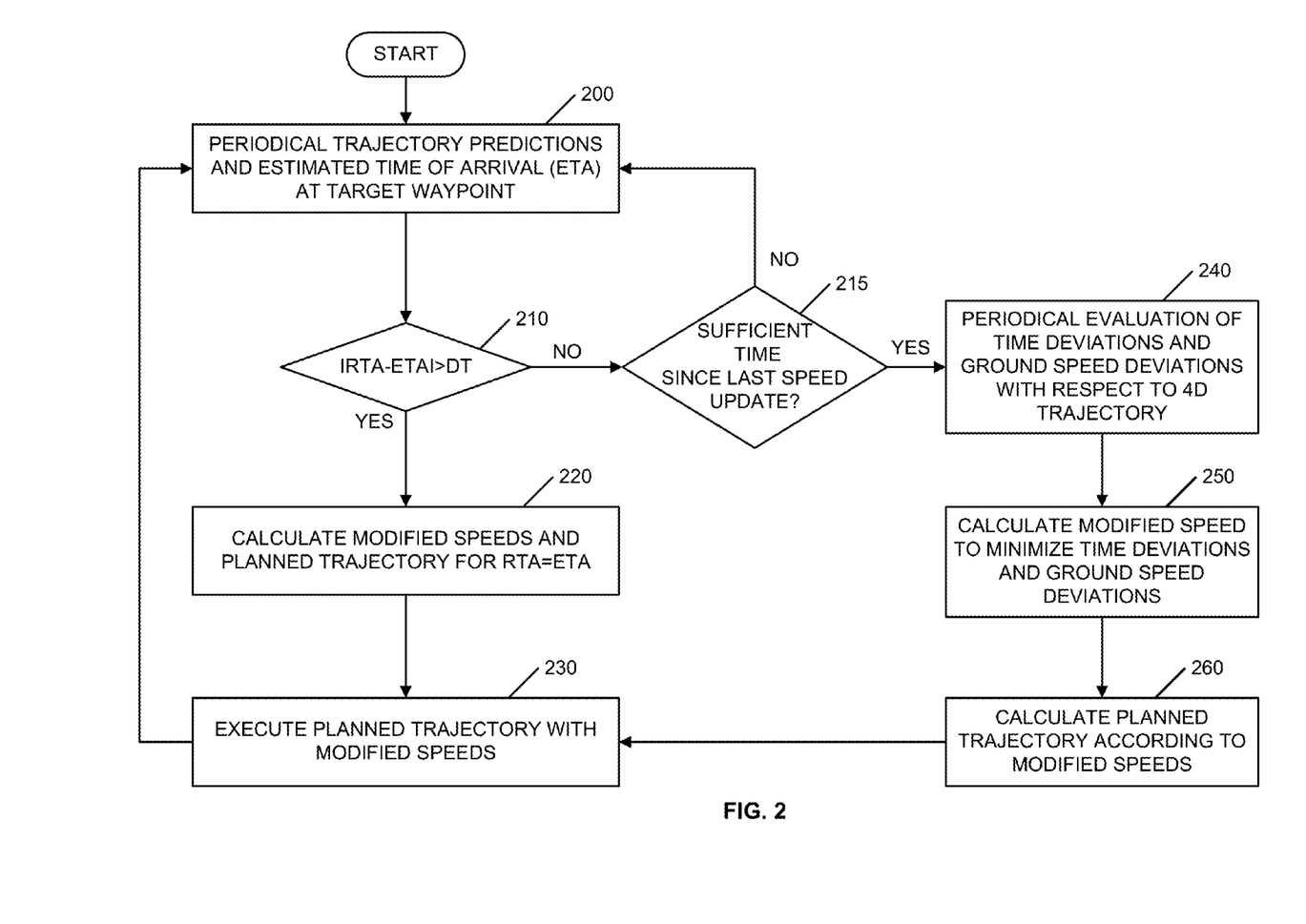
FIG. 2 shows a flowchart representative of an example method to guide an aircraft.
Figure 3:
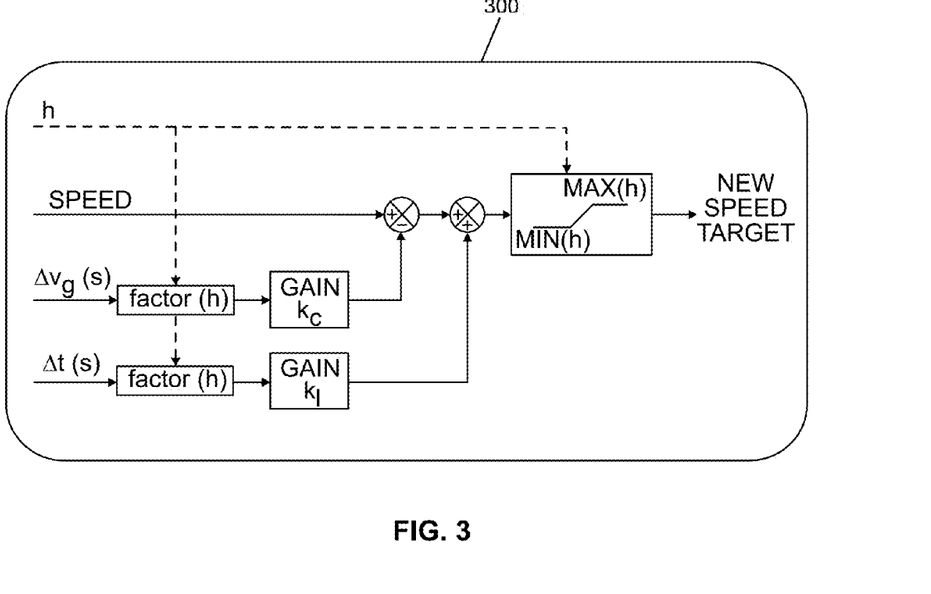
FIG. 3 shows a schematic diagram of an example aircraft speed controller, which may be used to implement the example method of FIG. 2.

A flowchart representative of an example method for implementing the system 300 as discussed below in connection with FIG. 3 is shown in FIG. 2. The example method may be implemented using machine readable instructions that comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 2, many other methods of implementing the example system 300 may alternatively be used. For example, the order of execution of the blocks may be changed, and/or some of the blocks described may be changed, eliminated, or combined.

As mentioned above, the example method of FIG. 2 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 2 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 2 shows a flowchart representative of an aircraft guidance method disclosed herein. The flowchart may be logically divided into two parts: a first part (to the left side of FIG. 2) that acts to reduce excessive differences between an ETA and a predefined RTA for a chosen waypoint, and a complementary second part, to the right of FIG. 2, which comprises a flow of calculations that seek to maintain the aircraft upon a selected (e.g., initial predicted or reference) 4D flight trajectory—that is, the plot of aircraft position, speed and direction as a function of time.

The second part of the flowchart, that is, the control loop to the right of FIG. 2 is enabled periodically, for example, when no speed adjustment is specified by the first part of the flowchart. In some examples decisions to adjust the speed of the aircraft as a result of discrepancies between the selected flight path and the measured (e.g., actual) flight trajectory are complementary to any decisions to adjust the aircraft speed as a result of RTA−ETA exceeding DT. Thus, the calculations in the first part of the example flowchart do not substitute or compete against the second part of the flowchart.

The example method of FIG. 2 starts at block 200. Here, the RTA at a predetermined waypoint is identified or selected. An initial predicted, or reference, 4D flight trajectory to the waypoint is also selected. This reference 4D trajectory may be predicted by the aircraft flight management system, or may be predicted elsewhere and provided to the aircraft.

At block 210, a difference between the RTA and a current ETA (based upon estimated and measured and/or sensed parameters) is determined. If the difference exceeds a threshold DT, then at block 220 new predictions are computed by modifying the planned speeds as part of calculating a new, or revised, planned trajectory, with the aim of reducing the difference between RTA and ETA. Once the new predictions have been calculated, at block 230 the updated planned trajectory with the new speeds to meet or substantially meet RTA is executed by sending a throttle adjustment signal so as to adjust the aircraft speed. In some examples, the parameter DT may be chosen to be larger further away from the waypoint. However, as will be explained below, by including the 4D flight trajectory control, deviations from RTA by aircrafts employing the examples disclosed herein tend to be smaller than in aircrafts employing traditional techniques, particularly as the waypoint is approached.

Referring still to FIG. 2, at block 210, if the difference between the RTA and the ETA is below the threshold DT, so that no speed adjustment would otherwise be mandated, the example method continues at block 215.

At block 215, a decision is made whether or not to proceed with evaluating time and ground speed deviations with respect to the reference, or initial predicted, 4D trajectory. During flight, the speed of the aircraft may be monitored and adjusted at several times according to the example method shown in FIG. 2. To avoid excessive changes in the speed of the aircraft and, thus, to avoid operational inefficiencies that may place undue stress on the aircraft engines from constant speed adjustments, a minimum time (e.g., $t_0$) is allowed to elapse between speed adjustments to meet or substantially meet RTA as implemented via blocks 210 and 220 of FIG. 2. Also, before proceeding to evaluate time and ground speed deviations with respect to the reference 4D trajectory, an additional amount of time (e.g., $t_1$) is allowed to elapse so as to avoid conflicts between the RTA-based speed changes implemented via blocks 210 and 220 and the speed changes implemented via blocks 240, 250, 260 in view of the reference 4D trajectory, as will be described below. For example, an RTA speed change as described at blocks 210 and 220 may be permitted every minute (e.g., $t_0$=1), whereas an evaluation with respect to the reference 4D trajectory may only be permitted five minutes after the last RTA speed change (e.g., $t_1$=5). As such, the aircraft guidance method of FIG. 2 provides for complementary speed updates in view of RTA and a reference 4D trajectory without conflicts between the updates to increase performance stability and speed control.

If sufficient time (e.g., time $t_1$) has not passed between speed updates, then the aircraft guidance method of FIG. 2 returns to block 200 with a periodical evaluation of the ETA. If, however, sufficient time has passed between speed updates, the example method of FIG. 2 proceeds to block 240 for an evaluation of the actual flight trajectory in view of the reference 4D trajectory.

At block 240, deviations of time and ground speed with respect to the initial predicted reference 4D trajectory are calculated. These deviations are not deviations of prediction of time of arrival at the target waypoint. Instead, these are deviations of current time and ground speed with respect to the reference 4D trajectory. For instance, if an aircraft reaches a waypoint X and was supposed to arrive at 12:05:10 Z and with a ground speed (speed with respect to the ground) of 450 knots, but the aircraft actually reaches the waypoint at 12:05:14 Z and with 445 knots of speed, the aircraft is late by 4 seconds ($\Delta t$=4 seconds) and slower than predicted by 5 knots ($\Delta vg$=−5 knots).

At block 250 of FIG. 2, a new speed command is generated in order to minimize the 4D navigation deviations. Example algorithms to compute the new speed command are as follows: if the aircraft is late, a speed increment proportional to time deviation is added to current speed. If the aircraft arrives early, by contrast, a speed decrease proportional to time deviation is taken off the current speed. Also if the aircraft flies slower with respect to the reference 4D trajectory and with respect to the ground, a speed increment proportional to ground speed deviation is added to current speed. Likewise if the aircraft flies faster with respect to the reference 4D trajectory and with respect to the ground, a speed reduction proportional to ground speed deviation is taken from current speed.

Some example speed command algorithms that may be used to implement the examples disclosed herein are described in U.S. patent application Ser. No. 12/760,613, which was filed on Apr. 15, 2010, and entitled "Four-Dimensional Guidance of an Aircraft," and is hereby incorporated by reference herein in its entirety.

At block 260, a new planned trajectory is calculated in view of the speed adjustments generated at block 250 to minimize the 4D navigation deviations. Predictions of the new planned trajectory are calculated so that they are consistent with the new speed command. The new estimated time of arrival at the target waypoint may in general differ from the Required Time of Arrival. However, this ETA should in general disagree with the RTA by a small magnitude compared to the threshold DT. This is particularly the case when the aircraft is far from the target waypoint, since the threshold DT, as explained above, is set very large in order to avoid too frequent RTA speed commands. The benefit of the new speed commands is particularly evident when the aircraft is far from the target waypoint: these new commands enable the aircraft to follow the 4D trajectory with accuracy precisely when the original RTA speed commands are less effective.

Finally at block 230, the planned trajectory with the new speed is executed and the new speed is immediately commanded. In some examples, the aircraft guidance method of FIG. 2 returns to block 200, where the initial predicted, or reference, 4D trajectory and ETA are periodically evaluated. In some examples, the reference 4D trajectory used during one or more implementations of the example method of FIG. 2 does not change (i.e., the same reference 4D trajectory serves as a reference point during one or more iterations of the example method of FIG. 2). In other examples, the reference 4D trajectory may be updated, for example, with the new planned trajectory executed at block 230 serving as the reference 4D trajectory for identifying time and groundspeed deviations during one or more subsequent iterations of the example method 200.

FIG. 3 shows a schematic of an example controller 300 that may be used to implement the example method of FIG. 2. The example controller 300 of FIG. 3 calculates the speed commands based on time and ground speed deviations with respect to the initial predicted, or reference, 4D trajectory. The algorithms are as explained above in connection with FIG. 2, and have proven to be stable, robust, and effective.

Figure 4:
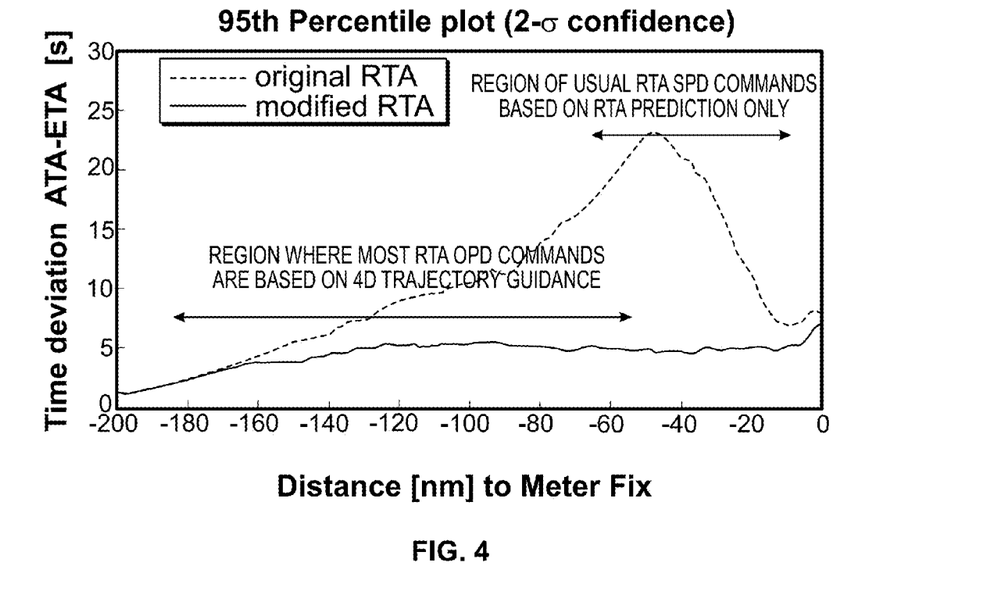
FIG. 4 shows a graph of the time deviation from a Required Time of Arrival at a waypoint, as a function of distance from that waypoint.

FIG. 4 shows statistical results of fast-time aircraft arrival simulations with the traditional RTA technology and the RTA technology implementing the examples disclosed herein. The plot shows the $95^{th}$ percentile of time error distribution as a function of distance to the metering fix (RTA target waypoint) for all the simulated aircraft. Two days of real southbound arrivals toward Palma de Mallorca International Airport (Spain) were used (over 230 flights of different aircraft types). Real and predicted winds and temperature were taken from Global Forecast System (GFS) for the same days. The metering fix is MUROS. Required times of Arrival were imposed by a traffic sequencer in MUROS, which thus becomes the RTA target waypoint. The traffic simulation tool takes accurate aircraft performance models, and assimilates weather and temperature conditions from different sources (GFS most notably). The tool also computes accurate flight plan and trajectory prediction for every aircraft, and simulates Auto-Flight and Auto-Throttle systems, pilot speed brake actuations, vertical navigation, lateral navigation, and RTA guidance (previously existing and new).

The simulations show that:
  Under known RTA guidance, the time deviations with respect to established reference 4D trajectories are confined to within 25 seconds for 95% of the flights. This is because the known RTA techniques avoid changes of aircraft speed far away from the metering fix.
  Time deviation using the examples disclosed herein for RTA guidance is greatly improved far from the metering fix, and kept under 6 seconds. This is because the new complementary 4D-navigation based speed commands guide the aircraft more accurately following the reference 4D trajectory.
  About 50 or 60 NM before the metering fix, existing RTA speed commands take place and reduce time deviations. For the examples disclosed herein, however, fewer speed commands are required, since flights reach this mid-range distance under good agreement with the reference 4D trajectory and, therefore, fewer speed corrections are required.
  In the last stretch of 10 NM to 20 NM, aircraft speeds are no longer modified, since there are additional operational constraints, and also because RTA techniques avoid speed changes too close to the metering fix (otherwise very large speed changes may occur). Therefore, time deviations grow up to 8 seconds for the traditional RTA techniques. An improvement is observed in the results using the examples disclosed herein (7 seconds of final error for 95% of aircraft).

Figure 5:
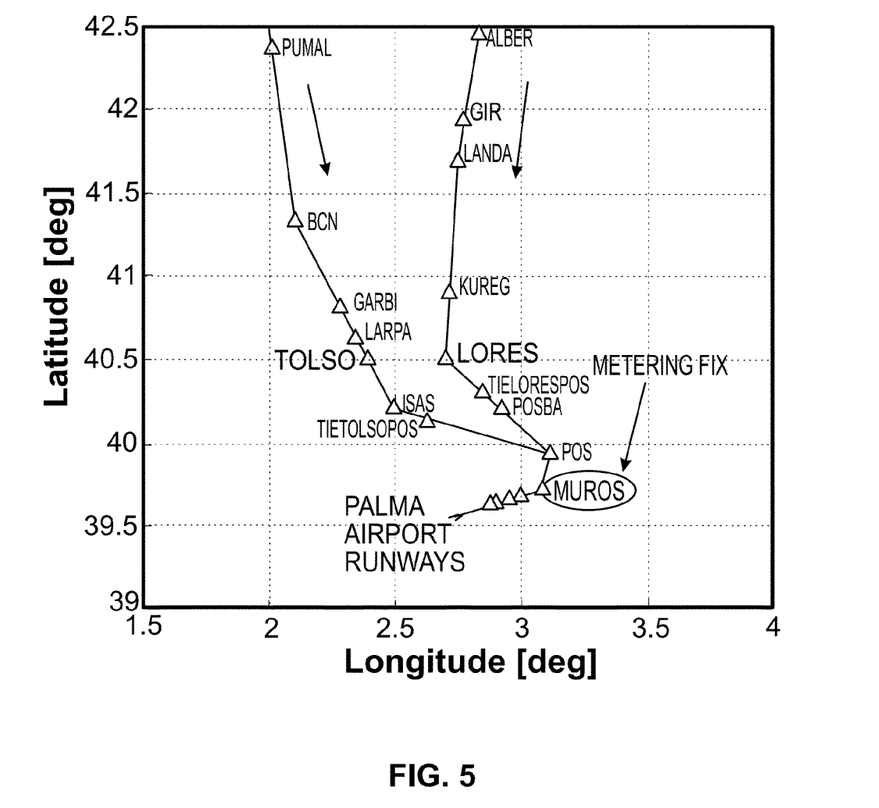
FIG. 5 shows simulated flight paths for aircraft arriving at a waypoint proximal to Palma de Majorca airport in Spain.

FIG. 5 shows the lateral tracks of the simulated arrivals at Palma de Majorca airport in Spain.

Figure 6:
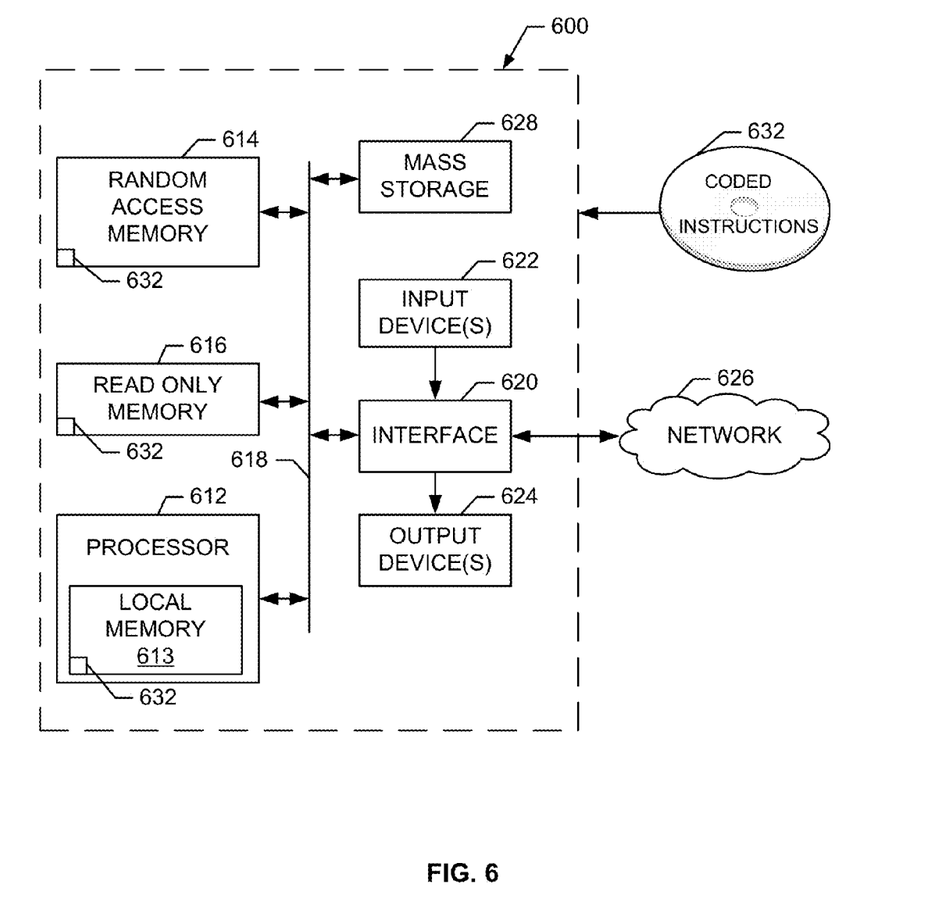
FIG. 6 is a diagram of a processor platform for use with the examples disclosed herein.

FIG. 6 is a block diagram of an example processor platform 600 capable of executing the instructions of FIG. 2 to implement the system of FIG. 3. The processor platform 600 can be, for example, a server, a personal computer, a mobile device (e.g., a cell phone, a smart phone, a tablet such as an iPad™), a personal digital assistant (PDA), an Internet appliance, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a trackpad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The coded instructions 632 of FIG. 6 may be stored in the mass storage device 628, in the volatile memory 614, in the non-volatile memory 616, and/or on a removable tangible computer readable storage medium such as a CD or DVD.

This patent claims priority from European Application No. 13382183.5, which was filed May 17, 2013, and entitled "Method and System for Aircraft Guidance," and is hereby incorporated by reference herein in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method of guiding an aircraft, comprising:
   measuring, via a processor, a current speed of the aircraft;
   selecting, via the processor, an initial predicted flight trajectory of an aircraft as a function of time, the initial predicted flight trajectory based on one or more of an altitude constraint, a speed constraint, or a Required Time of Arrival (RTA) constraint;
   determining, during flight, via the processor, a deviation between the initial predicted flight trajectory and a measured current flight trajectory of the aircraft, the determining to be performed a predetermined amount of time after execution of a speed adjustment to the aircraft to reach the measured current speed;
   generating, via the processor, a revised speed command to reduce the deviation;
   modifying, via the processor, a planned flight speed based upon the revised speed command; and
   executing, via the processor, the revised speed command to reduce time deviations and ground speed deviations with respect to the time and a ground speed, respectively, of the initial predicted flight trajectory.

2. The method of claim 1, wherein the revised speed command is a first revised speed command, and further comprising:
   identifying an initial Required Time of Arrival (RTA) at a waypoint;
   determining, during flight, an Estimated Time of Arrival (ETA) based upon at least one of a measured parameter or a predicted parameter;
   calculating a difference between the RTA and the ETA;
   determining whether the difference is greater than a threshold time; and
   generating a second revised speed command if the difference is greater than the threshold time.

3. The method of claim 1, wherein executing the revised speed command comprises sending a throttle adjustment signal to adjust a speed of the aircraft.

4. The method of claim 1, wherein determining the deviation between the initial predicted flight trajectory and the measured current flight trajectory comprises determining the deviation only if a magnitude of a difference between an initial Required Time of Arrival at a waypoint and an Estimated Time of Arrival at the waypoint is less than a threshold time.

5. The method of claim 1, further comprising determining a new predicted flight trajectory based on the revised speed command.

6. The method of claim 1, wherein determining the deviation comprises:
   determining a time difference between a predicted time of arrival at a location within the initial predicted flight trajectory and a measured time of arrival at the location; and
   determining a speed difference between a predicted speed at the location within the initial predicted flight trajectory and a measured speed at the location within the initial predicted flight trajectory.

7. The method of claim 6, wherein the revised speed command includes a speed change proportional to a magnitude of at least one of the time difference or the speed difference.

8. A method, comprising:
   measuring, via a processor, a current speed of an aircraft;
   determining, via the processor, a difference between an estimated time of arrival of the aircraft and a required time of arrival of the aircraft;
   determining, via the processor, if the difference exceeds a threshold time;
   determining, via the processor, a deviation between a predicted four-dimensional flight trajectory of the aircraft and a measured four-dimensional flight trajectory of the aircraft during flight, the determining to be performed a predetermined amount of time after execution of a speed adjustment to the aircraft to reach the measured current speed;
   if the difference does not exceed the threshold time, generating via the processor, a speed command to reduce the deviation; and
   updating, via the processor, a flight plan of the aircraft based on the speed command.

9. The method of claim 8, further comprising sending a throttle adjustment signal to adjust a speed of the aircraft based on the speed command.

10. The method of claim 8, wherein determining the deviation between the predicted four-dimensional flight trajectory and the measured four-dimensional flight trajectory comprises determining a location of the aircraft, a ground speed of the aircraft at the location and a time at which the aircraft is at the location.

11. The method of claim 10, wherein determining the deviation comprises:
    determining a speed difference between the ground speed and a predicted ground speed of the aircraft at the location; and
    determining a time difference between a measured time and a predicted time at which the aircraft is to be at the location.

12. The method of claim 11, wherein generating the speed command comprises generating a command to increase a speed of the aircraft an amount proportional to the time difference if the measured time is later than the predicted time.

13. The method of claim 11, wherein generating the speed command comprises generating a command to decrease a speed of the aircraft an amount proportional to the time difference if the measured time is before the predicted time.

14. The method of claim 8, wherein updating the flight plan comprises updating the estimated time of arrival.

15. The method of claim 8, wherein updating the flight plan comprises updating the predicted four-dimensional flight trajectory.

16. A method, comprising:
    measuring, via a processor, a current speed of an aircraft;
    determining, via the processor, a deviation between a predicted four-dimensional flight trajectory of the aircraft and a measured four-dimensional flight trajectory of the aircraft during flight, the determining to be performed a predetermined amount of time after execution of a speed adjustment to the aircraft to reach the measured current speed;
    generating, via the processor, a first speed command based on the deviation;
    adjusting, via the processor, the speed of the aircraft based on the speed command to reduce the deviation;

determining, via the processor, a difference between an estimated time of arrival and a required time of arrival of an aircraft at a waypoint;

generating, via the processor, a second speed command if the difference exceeds a threshold time; and adjusting, via the processor, the speed of the aircraft based on the second speed command.

17. The method of claim 16, wherein the waypoint is a first waypoint, and wherein determining the deviation between the predicted four-dimensional flight trajectory of the aircraft and the measured four-dimensional flight trajectory of the aircraft comprises determining at a second waypoint that the difference between the estimated time of arrival and the required time of arrival of the aircraft does not exceed the threshold time.

18. The method of claim 16, wherein the waypoint is a first waypoint, and wherein adjusting the speed of the aircraft based on the second speed command comprises:

determining a modified speed of the aircraft that is to enable the aircraft to arrive at a second waypoint at the required time of arrival; and adjusting the speed of the aircraft to be the modified speed.

19. The method of claim 18 further comprising updating a flight plan of the aircraft, the flight plan including the predicted four-dimensional flight trajectory and the estimated time of arrival.

20. The method of claim 16, wherein the predetermined amount of time for performing the determining of the deviation is based on a distance of the waypoint from a target waypoint.

* * * * *